(12) United States Patent
Kurachi

(10) Patent No.: US 6,222,572 B1
(45) Date of Patent: Apr. 24, 2001

(54) THERMAL RECORDING APPARATUS

(75) Inventor: Katsuhito Kurachi, Kasugai (JP)

(73) Assignee: Brother Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/157,543

(22) Filed: Sep. 21, 1998

(30) Foreign Application Priority Data

Sep. 22, 1997 (JP) .................................................. 9-256346

(51) Int. Cl.⁷ .................................................. B41J 2/355
(52) U.S. Cl. .......................................................... 347/184
(58) Field of Search ..................... 347/182, 183, 347/184, 188, 76, 177, 254; 400/120.09

(56) References Cited

U.S. PATENT DOCUMENTS

| 4,543,588 | 9/1985 | Fukui ..................................... 347/192 |
| 4,675,697 | 6/1987 | Sasaki et al. ........................... 347/182 |
| 4,724,446 | 2/1988 | Hirahara et al. ...................... 347/184 |
| 4,884,080 | 11/1989 | Hirahara et al. ........................ 346/46 |
| 4,890,121 | 12/1989 | Hirahara et al. ...................... 347/184 |
| 4,983,989 | 1/1991 | Komura et al. ........................ 347/211 |
| 5,099,259 | 3/1992 | Hirahara et al. ...................... 347/183 |
| 5,109,235 | 4/1992 | Sasaki .................................... 347/183 |
| 5,494,361 | * 2/1996 | Sonoda .................................. 346/177 |
| 5,706,046 | * 1/1998 | Eki et al. ............................... 347/252 |
| 5,961,227 | * 10/1999 | Kurachi .................................. 346/76 |

FOREIGN PATENT DOCUMENTS

| 0 190 901 A2 | 8/1986 | (EP) . |
| 0 225 697 A2 | 6/1987 | (EP) . |
| 0 732 841 A2 | 9/1996 | (EP) . |
| 6-30887 | 4/1994 | (JP) . |
| 7-46828 | 5/1995 | (JP) . |

\* cited by examiner

*Primary Examiner*—N. Le
*Assistant Examiner*—K. Feggins
(74) *Attorney, Agent, or Firm*—Oliff & Berridge, PLC

(57) ABSTRACT

The energy amount supplied to each dot forming a pixel is determined to 8 levels. In a dot pattern of the gradation level 1, the energy amount level 1 is provided to a dot 35 of the pixel 31. In the gradation level 2, the energy level 1 is provided to the dots 35 and 36. In the gradation level 3, the energy level 1 is provided to the dots 35 to 37. Similarly, the energy levels 1 to 8 are provided successively to the dots 35 to 38 to form dot patterns of the gradation levels 3 to 31. In the gradation level 32, the energy level 8 is provided to the dots 35 to 38.

17 Claims, 10 Drawing Sheets

FIG.6

| FORMATION ENERGY LEVELS | 1 | 2 | 3 | 4 | 5 | 6 | 7 | 8 |
|---|---|---|---|---|---|---|---|---|
| THE NUMBER OF PULSES | 2 | 4 | 6 | 8 | 12 | 20 | 32 | 63 |

FIG.10

| GRADATION LEVEL | GRADATION PATTERN |
|---|---|
| 1~16 | |
| 17~32 | |
| 33~48 | |
| 49~112 | |
| 113~128 | |

52

THERMAL RECORDING APPARATUS

BACKGROUND OF THE INVENTION

1. Field of the Invention

The present invention relates to a thermal recording apparatus which performs recording pixels each having a predetermined density by selectively driving a plurality of heating-elements mounted on a thermal head.

More particularly, the invention relates to a thermal recording apparatus, in which a pixel is formed by a plurality of dots arranged in a matrix form, capable of greatly increasing the number of gradation levels while maintaining resolution and providing a smooth change in the gradation of each pixel by forming a dot pattern in accordance with the energy amount of a dot formed in the matrix, the energy amount being quantized in multi levels.

2. Description of Related Art

Conventionally, there have been proposed various thermal recording apparatus using a thermal head for printing images with multi gradation levels.

For example, Japanese Patent (JP) publication No. 6(1994)-30887 discloses a thermal printer which selectively causing a plurality of heating resistance elements mounted on a thermal head to generate heat for printing out images is provided with means for driving the resistance elements on an every second pixel basis, which can produce an even density distribution in the printed images. The printer is also provided with means for energizing the resistance elements associated with odd pixels and those associated with even pixels at different time points, yet a plurality of resistance elements out of each of the odd and even resistance elements at the same time.

JP publication No. 7(1995)-46828 discloses a thermal transfer type recording apparatus including a thermal head provided with a plurality of heating-elements arranged in line, the thermal head being moved relative to a substantially perpendicular direction with respect to the arrangement direction of the heating-elements, yet the heating-elements being selectively caused to generate heat for transferring an ink to a desired position on printing paper, whereby to provide a gradation of each pixel in accordance with a dot matrix region of ink transferred. This apparatus further includes a memory which stores in advance plural dot patterns formed by dots in the matrix form to be transferred and the energy supply level of each heating-element, the energy supply level being quantized to multi levels, a determining means which determines, per pixel, the dot pattern constituted of dots in a matrix assigned to the pixel and the energy supply level of each heating-element corresponding to each dot based on the density for the multi-gradation level signal, referring to the memory, and means for causing the generation of heat and the movement of the thermal head in accordance with the pattern and energy supply level of the pixel, determined by the determining means. The memory stores a pattern of dots arranged in the relative movement of the thermal head as a pattern formed by a plurality a dots to be transferred in a matrix. The memory stores, preferably, the dot patterns in a low, middle, and high density ranges respectively, in which the pattern in a low density range comprises a single dot to be printed, the pattern in the middle density range comprises dots arranged in the direction of the relative movement of the thermal head, and the pattern in the high density range comprises at least one dot in addition to the dots arranged as above. The apparatus uses both a pseudo half tone printing method for printing images with gradation or gray levels and a heat energy control method. The apparatus also uses the patterns of dots arranged in the direction of the relative movement of the thermal head to printing paper for a pattern comprising a plurality of dots to be printed in a matrix to provide a gradation level. Accordingly, the apparatus can print half tone images improved in resolution and image quality.

However, in the thermal printer disclosed in JP publication No. 6-30887, one pixel is constituted of a plurality of dots and the heating-element corresponding to each dot is driven to control the gradation level of each pixel, so that the resolution and the number of gradation levels are degraded if one pixel is formed by a small number of dots.

In the thermal transfer recording apparatus disclosed in JP publication No. 7-46828, the pattern is formed by a part of dots in a matrix of each pixel. As a result, there occur problems that there is a limitation in a minimum number of dots forming one pixel and that the constant matrix size can not provide the large increment of the number of gradation levels without degrading resolution.

SUMMARY OF THE INVENTION

The present invention has been made in view of the above circumstances and has an object to overcome the above problems and to provide a thermal recording apparatus which prints a pixel in a dot matrix formed by a plurality of dots and forms a dot pattern by quantizing the amount of energy supplied to a heating-element whereby to form the dot matrix, resulting in the great increment of the number of gradation levels with a constant resolution and a smooth change in the gradation of each pixel.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, there is provided a thermal recording apparatus including a heat recording device provided with a plurality of heating-elements, a dot pattern memory for storing a dot pattern defined by a plurality of dots arranged in a matrix form, forming a pixel to be printed with the heat recording device, a gradation level pattern memory for storing a plurality of gradation level patterns formed per pixel by determining a minimum and maximum values of dot formation energy to be supplied to the heating-element, and providing the minimum energy value to one of the print dots forming a pixel and to remaining print dots in a predetermined sequence until the maximum energy value is provided to all of the print dots, and a heat-generation drive device for selectively driving the heating-elements of the heat recording device in accordance with the dot pattern of the print dots stored in the dot pattern memory and the gradation level pattern stored in the gradation level pattern memory.

In the above thermal recording apparatus, each pixel is formed by a plurality of dots in a matrix form, and the level of energy amount of each dot is quantized and stored in the gradation level pattern memory. As the increase of the gradation density, the number of dots to be provided in the matrix is increased one by one in a predetermined sequence, when a minimum value of the energy level is sequentially assigned to each dot. If the minimum energy value is provided to all of the dots, the energy level of each dot is changed in a predetermined sequence to the next large level until a maximum energy level is provided to all of the dots, thereby forming dot patterns. Thus, the dot patterns are stored in advance in the dot pattern memory. The heating-elements corresponding to the dot pattern are driven to generate heat to print dots of a predetermined energy level, performing multi gradation recording of each pixel.

Since the energy level of each dot constituting a matrix is quantized, accordingly, a large number of gradation levels can be provided even by the same matrix size as conventional one. In addition, the number of gradation levels can be increased even by small matrix size. Consequently, a smooth change in gradation levels can be achieved without degrading resolution.

According to another example of the present invention, there is provided a thermal recording apparatus including an input device for inputting character data, a thermal head provided with a plurality of heating-elements to print characters corresponding to the character data input by the input device on a tape, a dot pattern memory for storing a dot pattern defined by a plurality of print dots in a matrix form, forming a pixel to be printed with the thermal head, a gradation level pattern memory for storing a plurality of gradation level patterns formed per pixel by determining minimum and maximum values of dot formation energy to be supplied to the heating-element, and providing the minimum energy value to one of the print dots forming a pixel and to remaining print dots in a predetermined sequence until the maximum energy value is provided to all of the print dots, and a heat-generation drive device for selectively driving the heating-elements of the thermal head in accordance with the dot pattern of the print dots stored in the dot pattern memory and the gradation level pattern stored in the gradation level pattern memory.

Furthermore, according to another example of the present invention, there is provided a thermal recording apparatus including a heat recording device provided with a plurality of heating-elements, a dot pattern memory for storing data on a dot pattern defined by a plurality of print dots in a matrix form, forming a pixel to be printed with the heat recording device, a drive energy memory for storing predetermined values each of which corresponding to drive energy applied to the heating-elements and is different every area obtained by dividing gradation density data into plural areas, each area having gradation patterns according to a number of the print dots in the matrix form and each gradation pattern being determined by setting the predetermined value to the print dots in a predetermined sequence in each area, and a heat-generation drive device for selectively driving the heating-elements of the heat recording device in accordance with the dot pattern data of the print dots stored in the dot pattern memory and the predetermined values of the dots stored in the drive energy memory.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 6 is a table listing the number of pulses of a pulse train corresponding to the amount level of energy supplied to form each dot in the embodiment;

FIG. 10 is a data table of showing the relationship between the gradation level and the dot pattern of a pixel in the second embodiment.

DETAILED DESCRIPTION OF THE PREFERRED EMBODIMENTS

A detailed description of preferred embodiments of a tape printing device embodying a thermal recording apparatus of the present invention will now be given referring to the accompanying drawings. At first, the control system of the tape printing device in the first embodiment is explained with reference to FIG. 1.

Figure 1:
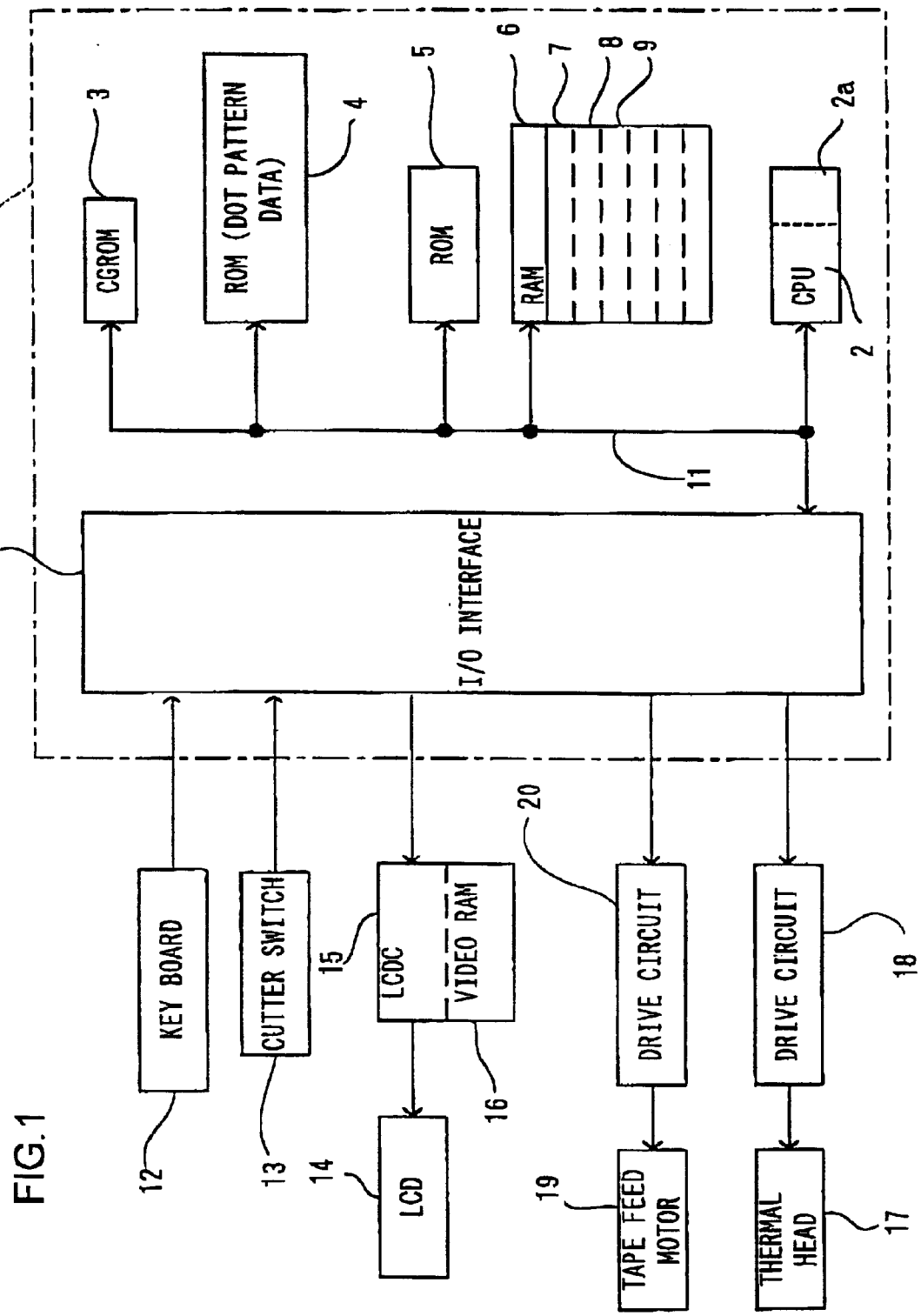
FIG. 1 is a block diagram showing a control system of a tape printing device in a first embodiment according to the present invention.

In FIG. 1, the controller 1 has a CPU 2 for controlling each component of the tape printing device. The controller 1 further has an input/output interface 10, a CGROM 3, ROMs 4 and 5, and a RAM 6, which are connected to the CPU 2 through a data bus 11. The CPU 2 is internally provided with a timer 2a.

The CGROM 3 stores dot pattern data corresponding to a large number of characters to be displayed, in the form of code data.

The ROM (dot pattern data memory) 4 stores printing dot pattern data, in the form of code data, of characters such as alphabets, symbols, the printing dot pattern data being classified according to fonts (Gothic type font, Ming-cho type font, etc,), yet in six dot sizes (of 16, 24, 32, 48, 64, and 96 dots) per font type. The ROM 4 also stores graphic pattern data for printing graphic images with gradation levels.

The ROM 5 stores a display drive control program for controlling an LCDC 15 in response to the code data corresponding to characters, numerals, etc. which are input with the keyboard 12, a print drive control program for driving a thermal head 17 and the tape feed motor 19 by reading out the data from a print buffer 8, a data table 41 (see FIG. 4) of the number of pulses of a pulse train in corresponding with each energy amount level (referred to simply as energy level, hereinafter), gradation pattern tables 40 and 52 (see FIGS. 2 and 10) which will be mentioned later, and other various programs needed for the control of the tape printing device. The CPU 2 executes various calculations based on the programs stored in the ROM 4.

The ROM 6 has a text memory 7, the print buffer 8, and a counter 9, and others. The text memory 7 stores text data input from the keyboard 12. The print buffer 8 stores print dot pattern, or print data, which corresponds to a plurality of characters, symbols, and others. The thermal head 17 can print dot images in accordance with the dot pattern data stored in the print buffer 8. The counter 9 stores a count value N which is to be counted in correspondence with each of the heating-elements in the gradation level control process.

Returning to FIG. 1, to the I/O interface 10 are connected the keyboard 12, a cutter switch 13 for cutting a printed tape, a display controller (referred to as LCDC hereinafter) 15 including a video RAM 16 for outputting display data to an LCD 14, a drive circuit 18 for driving the thermal head 17, and a drive circuit 20 for driving the tape feed motor 19.

If some characters are input through character keys on the keyboard 12, the text data of the characters are successively stored in the text memory 7. Simultaneously, the dot pattern corresponding to the characters input through the keyboard 12 is displayed on the LCD 14 in accordance with a dot pattern generation control program and a display drive control program. Furthermore, the thermal head 17 is driven by the drive circuit 18 to print a dot pattern corresponding to dot pattern data stored in the print buffer 8, and the tape feed motor 19 is driven by the drive circuit 20 to feed a tape at the same time. The thermal head 17 is provided with a plurality of heating-elements which are selectively driven through the drive circuit 18 to generate heat for printing out images such as characters on the tape. It is to be noted that the structure of the tape printing device is well known in the art, the detail explanation thereof is omitted here.

Figure 2:
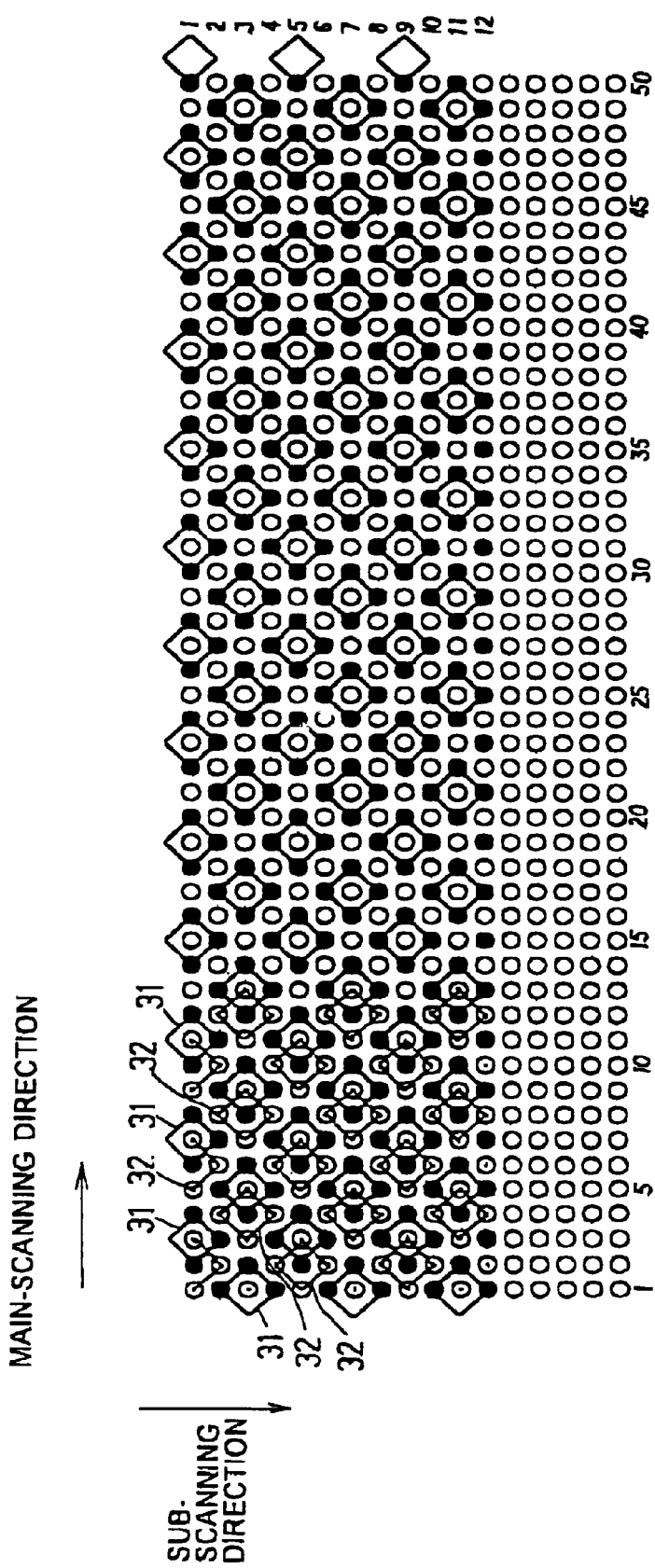
FIG. 2 schematically shows a dot pattern data stored in a print buffer 8 in the first embodiment.
Figure 3:
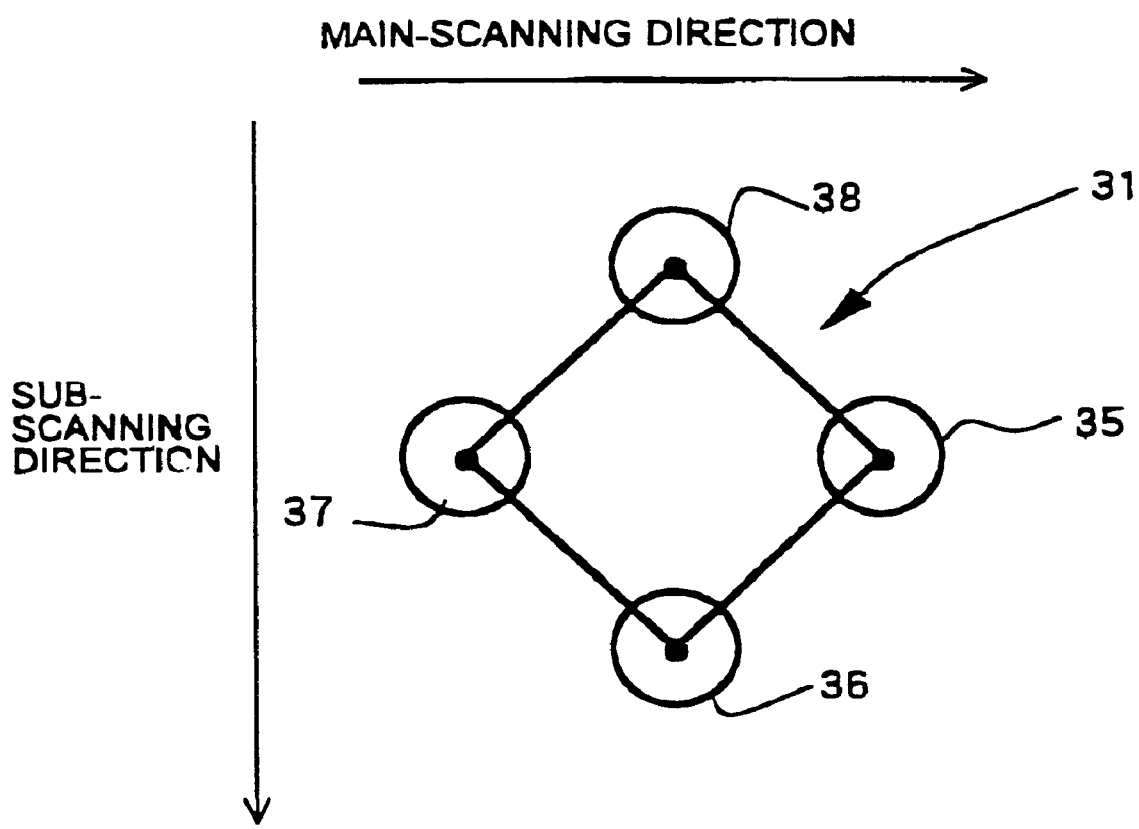
FIG. 3 shows a dot structure of a pixel in the first embodiment.
Figure 4:
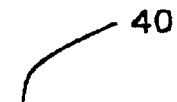
FIG. 4 is a data table showing the relationship between the gradation level and the dot pattern of each pixel in the first embodiment.

Next, multi gradation level printing to be executed by the tape printing device will be described with reference to FIGS. 2 to 4. FIG. 2 schematically shows a dot pattern data stored in the print buffer 8 in the first embodiment. FIG. 3 shows a dot structure of a pixel in the first embodiment. FIG. 4 is a data table showing the relationship between the gradation level and the dot pattern of each pixel in the first embodiment.

In the first embodiment, the thermal head 17 is provided with fifty heating-elements arranged in line. The number of heating-elements in this embodiment is determined to 50 for convenience of explanation but it is not limited thereto.

At first, the character keys on the keyboard 12 are operated to constitute a text including graphic images with gradation levels. The data of the text formed is stored in the text memory 7. If the print key on the keyboard 12 is depressed to command a print start, then the print data is produced based on the text data stored in the text memory 7, the printing dot pattern data and the graphic pattern data stored in the ROM 4, and the gradation pattern table 40 stored in the ROM 50, and then the print data is stored in the buffer 8. Based on this print data, the pulse train consisting of the predetermined number of pulses corresponding to a specific gradation level of each of the selected heating-element is applied to each heating-element to generate heat.

The control of the heating-elements of the thermal head 17 will be explained with reference to FIG. 2. As shown in FIG. 2, each of pixels 31 and 32 is formed by 2×2 dots, namely, four dots in a rhombic matrix form put in a staggered and latticed arrangement.

The data of odd dots (first, third, fifth, . . . forty-ninth dots) consisting the pixels 32 to be printed in the heating-element arrangement direction (referred to as the main-scanning direction hereinafter) and on the first line in the print direction (referred to as the sub-scanning direction hereinafter) is read out from the print buffer 8. Then, the first, third, fifth, seventh, ninth, eleventh, . . . and forty-ninth dots are printed. Subsequently, the data of even dots (second, fourth, sixth, . . . fiftieth dots) consisting the pixels 31 to be printed in the main-scanning direction and on the first line is read out from the buffer 8, and the second, fourth, sixth, . . . fiftieth dots are printed. Next, the data of odd dots constituting the pixels 31 in the main-scanning direction and on the second line in the sub-scanning direction is read out and all of the dots are printed. The data of even dots constituting the pixels 32 in the main-scanning direction and on the second line in the sub-scanning direction is read out. The second, fourth, sixth, eighth, tenth, twelfth . . . and fiftieth dots are printed. The same applies to the other pixels 31 and 32 on the third and subsequent lines in the sub-scanning direction. Concretely, when the print data is sequentially read out from the print buffer 8, the heating-elements corresponding to the odd dots and those corresponding to the even dots are energized at different time points to generate heat to print the pixels.

Next, the gradation pattern of each of the pixels 31 and 32 is described with reference to FIGS. 3 and 4. Each of the pixels 31 and 32 is formed by four dots arranged in a rhombic matrix form, each apex of the rhombus form is the center of each dot. As shown in FIG. 3, the pixel 31 consists of four dots 35, 36, 37, and 38 arranged in a rhombic matrix, those dots 35 to 38 being given printing priority in order of the dots 35→36→37→38 in a clockwise direction. The pixel 32 has the same structure as the pixel 31. Note that the order of printing priority may be reverse.

The energy amount of each dot is divided into eight levels. Accordingly, each pixel 31 or 32 can be represented in 32 gradation levels resulted from 4 dots×8 energy levels. The gradation pattern of a pixel 31 in that case is explained concerning the gradation pattern table 40 shown in FIG. 4.

In the dot pattern of the gradation level 1, the energy level 1 is provided to the dot 35 of the pixel 31. In the gradation level 2, the energy level 1 is provided to the dots 35 and 36. In the gradation level 3, the energy level 1 is provided to the dots 36, 36, and 37. In the gradation level 4, the energy level 1 is provided to the dots 35, 36, 37, and 38.

In the dot pattern of the gradation level 5, the energy level 2 is provided to the dot 35 of the pixel 31 and the energy level 1 is provided to the dots 36 to 38. In the gradation level 6, the energy level 2 is provided to the dots 35 and 36 and the energy level 1 to the dots 37 and 38. In the gradation level 7, the energy level 2 is provided to the dots 35, 36, and 37 and the energy level 1 to the dot 38. In the gradation level 8, the energy level 2 is provided to the dots 35, 36, 37, and 38.

In the dot pattern of the gradation level 9, the energy level is provided to the dot 35 and the energy level 2 to the dots 36, 37, and 38. In the gradation level 10, the energy level 3 is provided to the dots 35 and 36 and the energy level 2 to the dots 37 and 38. In the gradation level 11, the energy level 3 is provided to the dots 35, 36, 36 and 37 and the energy level 2 to the dot 38. In the gradation level 12, the energy level 3 is provided to all the dots 35, 36, 37, and 38 of the pixel 31.

In the dot pattern of the gradation level 13, the energy level 4 is provided to the dot 35 and the energy level 3 to the dots 36, 37, and 38. In the gradation level 14, the energy level 4 is provided to the dots 35 and 36 and the energy level 3 to the dots 37 and 38. In the gradation level 15, the energy level 4 is provided to the dots 35, 36, and 37 and the energy level 3 to the dot 38. In the gradation level 16, the energy level 4 is provided to all the dots 35, 36, 37, and 38.

Similarly, the energy level 5 is provided to the dots 35, 36, 37, and 38 of each of the pixels 31 to consist dot patterns of the gradation levels 17 to 18. In the gradation level 29, the energy level 8 is provided to the dot 35 and the energy level 7 to the dots 36, 37, and 38. In the gradation level 30, the energy level 8 is provided to the dots 35 and 36 and the energy level 7 is provided to the dots 37 and 38. In the gradation level 31, the energy level 8 is provided to the dots 35, 36, and 37 and the energy level 7 to the dot 38. In the gradation level 32, the energy level 8 is provided to all the dots 35, 36, 37 and 38.

The pixel 32 is constituted of each of dot patterns represented with 32 gradation levels as well as the pixel 31.

Figure 5:
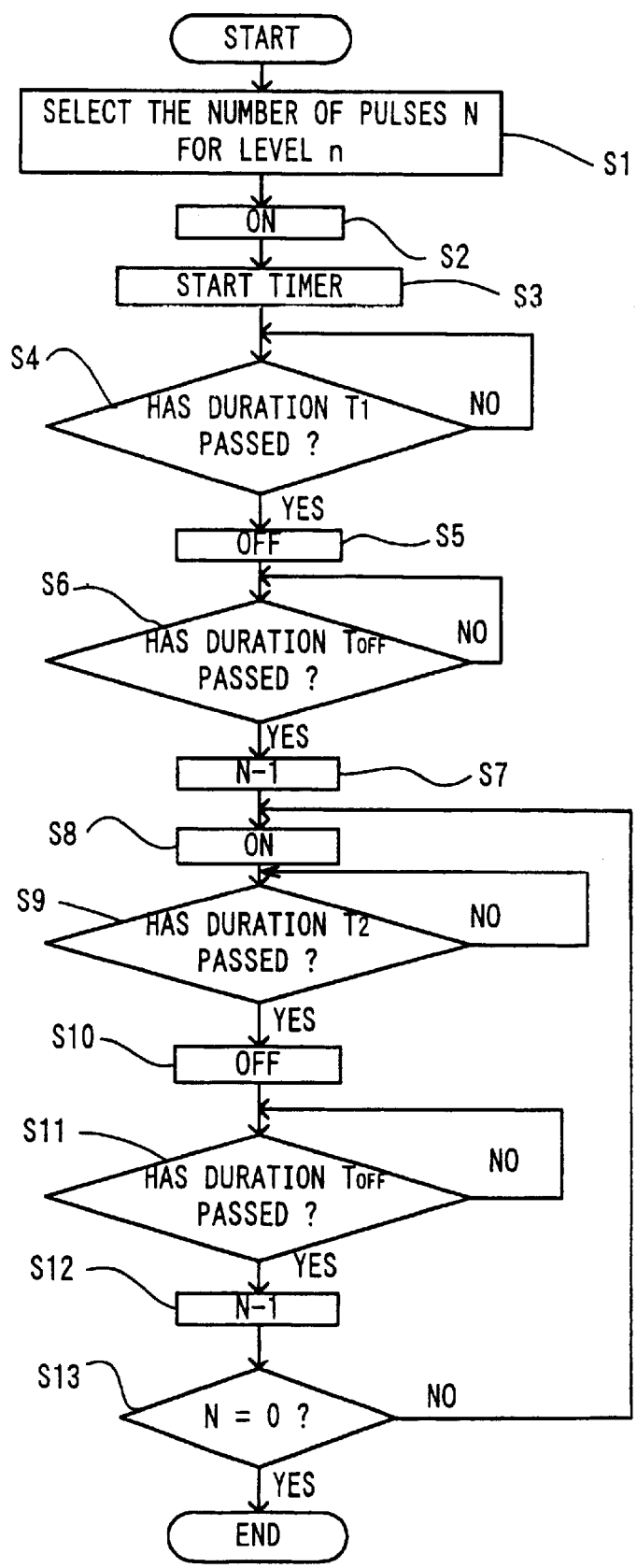
FIG. 5 is a flowchart of a dot printing operation in the tape printing device in the first embodiment.
Figure 7:
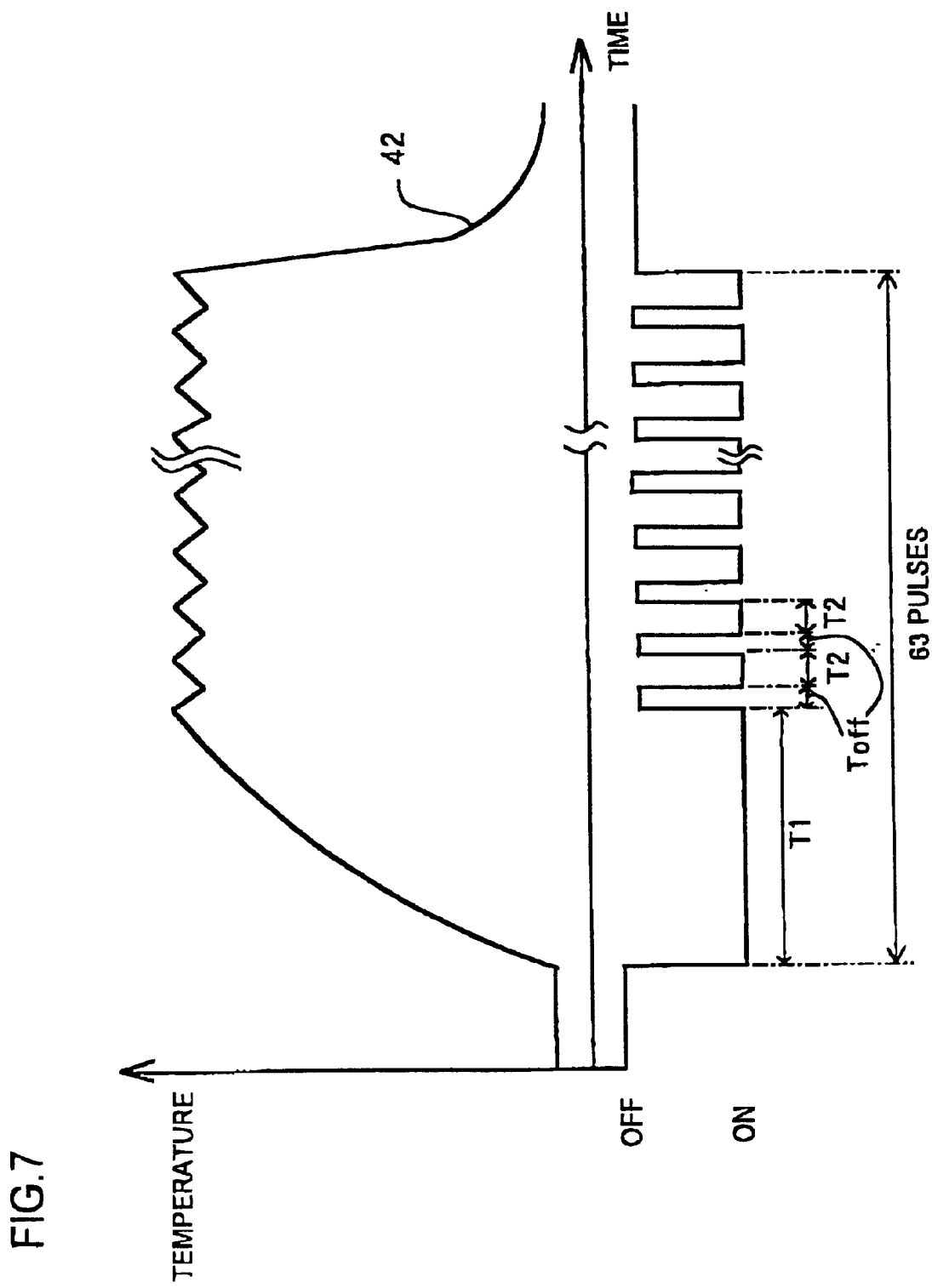
FIG. 7 is a time-chart in the case that 63 pulses are applied to heating-elements.

Meanwhile, the energy amount level divided into eight levels and the dot printing process based on the energy levels are explained with reference to FIGS. 5 to 7. FIG. 5 is a flowchart of the dot printing process executed in the controller 1 of the apparatus in the first embodiment. FIG. 6 is a table listing the number of pulses of a pulse train corresponding to the energy level of the print dot in the first embodiment. FIG. 7 is a time chart of the dot printing process in which 63 pulses are applied.

When a text including graphic images with gradation levels is prepared by the operation of character keys on the keyboard 12, the data of the text is stored in the text memory 7. Upon depression of the print start key on the keyboard 12, supplying a print start command signal, the print data is produced based on the text data stored in the text memory 7 and the print dot pattern data and the graphic pattern data stored in the ROM 4, and the produced print data is stored in the print buffer 8.

The CPU 2 applies the pulse train consisting of the predetermined number of pulses for the energy level corresponding to the gradation level of each dot, determined based on the print data and the data table 41 stored in the ROM 5 to each of the selected heating-elements mounted on the thermal head 17, thus starting the multi gradation level recording with 32 gradation levels.

Next, the application of each pulse train of the predetermined number of pulses for the energy level corresponding to the gradation level is explained below.

The number of pulses corresponding to the energy level of a print dot is read out from the table 40 (see FIG. 6) stored in the ROM 5. The number of pulses N with respect to each heating-element is stored in the counter 9 (S1).

Here, the table 41 is explained with reference to FIG. 6. The tape printing device in the present embodiment has 8 levels of energy supplied to a heating-element. The number of pulses N corresponding to each energy level is determined at 2 pulses for the energy level 1, 4 pulses for the energy level 2, 6 pulses for the energy level 3, 8 pulses for the energy level 4, 12 pulses for the energy level 5, 20 pulses for the energy level 6, 32 pulses for the energy level 7, and 63 pulses for the energy level 8.

In the table 41, accordingly, the increasing rate of pulses is set so as to be small in the low energy level region and large in the high energy level region.

Subsequently, when the CPU 2 starts the application of pulses to each of the selected heating-elements of the thermal head 17 to generate heat (S2).

The CPU 2 operates the timer 2a to start (S3), and reads the ON-duration $T_1$ of the first pulse from the ROM 5 and waits until the count time of the timer 2a reaches the ON-duration $T_1$ (S4:NO). When the ON-duration $T_1$ has passed (S4:YES), the CPU 2 interrupts the application of pulses to the selected heating-elements, and stops the timer 2a to reset the count time to 0 and starts the timer 2a again (S5).

Next, the CPU 2 reads the OFF-duration $T_{off}$ of the pulses from the ROM 5 and waits until the timer 2a counts the OFF-duration $T_{off}$ (S6:NO). When the OFF-duration $T_{off}$ has passed (S6:YES), the timer 2a is stopped to reset the count time to 0 and then restarted.

Next, the CPU 2 reads the number of pulses N corresponding to each of the selected heating-elements from the counter 9, subtracts 1 from the number N, and restores the calculated number per the heating-element in the counter 9 (S7). Sequentially, the CPU 2 makes the application of pulses to each of the selected heating-elements of the thermal head 17 (S8).

The CPU 2 reads the second ON-duration $T_2$ of the application of the second and subsequent pulses and waits until the count time of the timer 2a reaches $T_2$ (S9:NO). After a lapse of the ON-duration $T_2$ (S9:YES), the application of pulses to each of the selected heating-elements is turned OFF, and the timer 2a is stopped to reset the count time to 0 and is restarted (S10).

Here, the ON-duration $T_2$ of the second and subsequent pulses is set shorter than the ON-duration $T_1$ of the first pulse.

Next, the CPU 2 reads the OFF-duration $T_{off}$ of pulses from the ROM 5 and waits until the timer 2a counts the OFF-duration $T_{off}$ (S11:NO). After a lapse of the OFF-duration $T_{off}$ (S11:YES), the CPU 2 stops the timer 2a to reset the count time to 0 and restart the timer 2a.

The CPU 2 reads the number of pulses N corresponding to each of the selected heating-elements from the counter 9, subtracts 1 from the number N, and restores the calculated number per heating-element in the counter 9 (S12).

The CPU 2 reads the number of pulses N from the counter 9 and, if the number N is not 0 (S13:NO), makes the application of pulses to the selected heating-elements (S8). These steps from S8 are repeated until the number of pulses N reaches 0.

When the number of pulses N is 0 (S13: YES), the application of pulses to the selected heating elements is terminated.

Next, an example of a change in temperature of a heating-element by the application of the pulse train corresponding to the above energy level will be explained, referring to FIG. 7. FIG. 7 is a graph showing the temperature-rise of the heating-element relative to the time when the pulse train for the energy level 8, in other words, when the number of pulses N to be applied to the heating-element is 63.

The first pulse is applied for the duration $T_1$. The increasing temperature curve 42 of the heating-element substantially comes up to the intended heating temperature. The application of pulses is turned off for the duration $T_{off}$, causing a small decrease in temperature. The temperature increases again upon the application of the second pulse for the duration $T_2$. The interruption of pulse application for the duration $T_{off}$ and the execution of pulse application for the duration $T_2$ are repeated until the number of pulses N stored in the counter 63 becomes 0.

The heating-element is preheated by the first applied pulse to a predetermined temperature and then maintained at an almost constant temperature for the duration defined by ($T_2 \times 62 + T_{off} \times 62$) by the second through sixty-third applied pulses, so that the dot of the energy level 8 is printed.

Similarly, the dot of the energy level 1 is printed by the pulse train of 2 pulses. The dot of the level 2 is printed by the pulse train of 4 pulses. The dot of the level 3 is printed by the pulse train of 6 pulses. The dot of the level 4 is printed by the pulse train of 8 pulses. The dot of the level 5 is printed by the pulse train of 12 pulses. The dot of the level 6 is printed by the pulse train of 20 pulses. And the dot of the level 7 is printed by the pulse train of 32 pulses.

Figure 8:
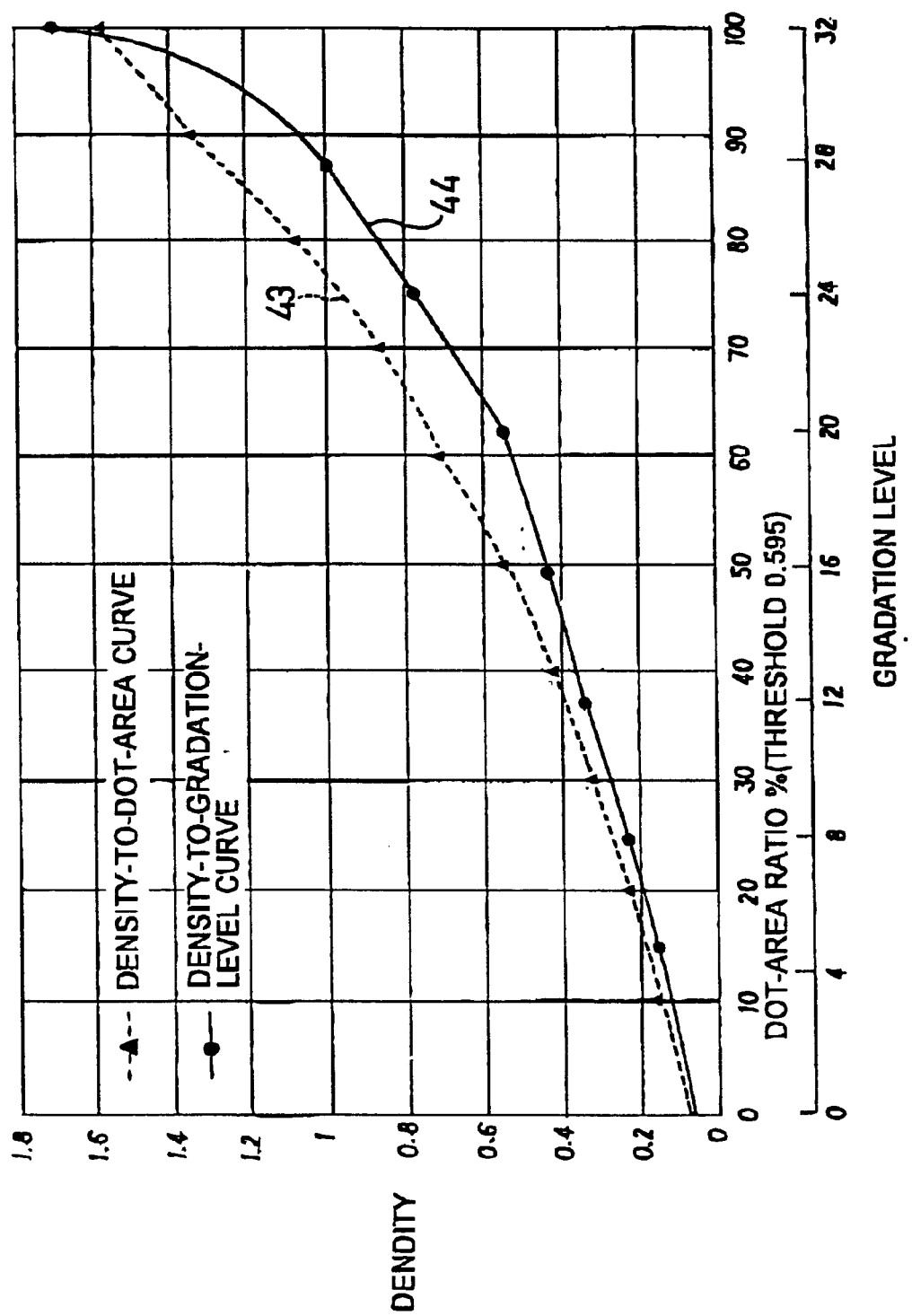
FIG. 8 is a graph showing the relation of the gradation levels and the dots-area ratio with the density.

Next, explanation is made on an example of the relationship of the density with the gradation level and the ratio of area of dots forming a grid pattern when the controller 1 of the tape printing device in the first embodiment performs the gradation control process to print dots, referring to FIG. 8.

It is to be noted that a dot is the minimum unit of the area of ink adhered on a recording medium or the like, variation of the size (area) of the dots causes the gradation level to be represented. The density with respect to each ratio of the dots-area of ink is measured by a densitometer, with 0.595 of the threshold of the ink dots-area in the present embodiment. As a result of the measurement, the relationship between the density and each of the dots-area ratios varies as shown by a density-to-dots-area curve 43 in FIG. 8.

Specifically, the following results are obtained: the density is 0.15 for 10% of dots-area ratio, 0.23 for 20% of the ratio 0.31 for 30% of the ratio, 0.41 for 40% of the ratio, 0.55 for 50% of the ration, 0.71 for 60% of the ratio, 0.86 for 70% of the ratio, 1.08 for 80% of the ratio, 1.35 for 90% of the ratio, 1.58 for 100% of the ratio.

As mentioned above, the number of pulses to be applied to the thermal head is determined for each gradation level so that the density with respect to each gradation level agrees with the above density with respect to each dots-area ratio. In the present embodiment, the number of pulses in the table 41 of FIG. 6 is set.

In the present embodiment, the following results are obtained: the density is 0.15 for the gradation level 4, 0.22 for the level 8, 0.34 for the level 12, 0.44 for the level 16, 0.54 for the level 20, 0.78 for the level 24, 1.0 for the level 28, and 1.7 for the level 32. Accordingly, the relationship between the density and each gradation level varies as shown by the density-to-gradation-level curve 44 of FIG. 8.

Thus, the density-to-gradation-level curve 44 showing the relationship between the print density and each gradation level substantially agrees with the density-vs.-dots-area curve 43 showing the relationship between the print density and the dots-area ratio. In other words, if the number of pulses is set corresponding to the energy level based on the data table 41 shown in FIG. 6, the density-vs.-gradation-level curve 44 of the dot pattern based on the gradation patter table 40 becomes almost the same as the density-vs.-dots-area curve 43.

As described above in detail, in the tape printing device in the first embodiment, when the print start is commanded upon depression of the print key on the keyboard 12, the controller 1 operates to produce the print data based on the text data stored in the text memory 7, the print dot pattern data and the graphic pattern data stored in the ROM 4, and the gradation pattern table 40 stored in the ROM 5, and then to store the produced print data in the print buffer 8. Based on the print data and the data table 41 in the ROM 5, the pulse train of the predetermined number of pulses for the energy level corresponding to the gradation level of the dot to be printed is applied to each of the selected heating-elements, thus starting the multi gradation level recording with 32 gradation levels.

The width (application duration) of the first pulse of the pulse train to be applied to each heating-element of the thermal head 17 is set at $T_1$, thereby to preheat the heating-element to a predetermined heating temperature. The application of pulses is then turned off for the duration $T_{off}$. The width of the second pulse of the pulse train is set at the duration $T_2$. The execution of pulse application for the duration $T_2$ and the interruption for the duration $T_{off}$ are alternately made until the predetermined number of pulses are applied to the heating-element thereby to print the dot with a predetermined size, thereby recording the pixels with 32 gradation levels.

Accordingly, the energy amount supplied to a heating-element to print a dot constituting a matrix is divided into eight levels as above, so that a 2×2 dot, i.e., 4-dot matrix can provide 32 gradation levels (4 dots×8 energy levels). Such the 4-dot matrix can provide a large number of gradation levels, which can achieve a smooth change in gradation without degrading resolution.

The heating-elements corresponding to odd dots and those corresponding to even dots are alternately driven to generate heat thereby to alternately print the pixels of odd dots and those of even dots in a staggered and latticed arrangement. Furthermore, one of the heating-elements for odd dots and those for even dots is driven to generate heat to print dots upon the lapse of a predetermined period of time after another heating-elements have been driven to generate heat, so that a long distance can be provided between the dots printed at the same time. As a results, the influence of heat accumulation of each heating-element can be reduced, which enables printing of minute dots, so that the quantization of energy level of each dot can increase the number of gradation levels.

The dot pattern is set so that the density-to-gradation level curve 44 of a pixel substantially agrees with the density-to-dots-area curve 43. As a result, the thermal recording even in the low density level can provide a clear change in density of print images, resulting in the thermal recording which produces print images easy to recognize for human eyes.

Figure 9:
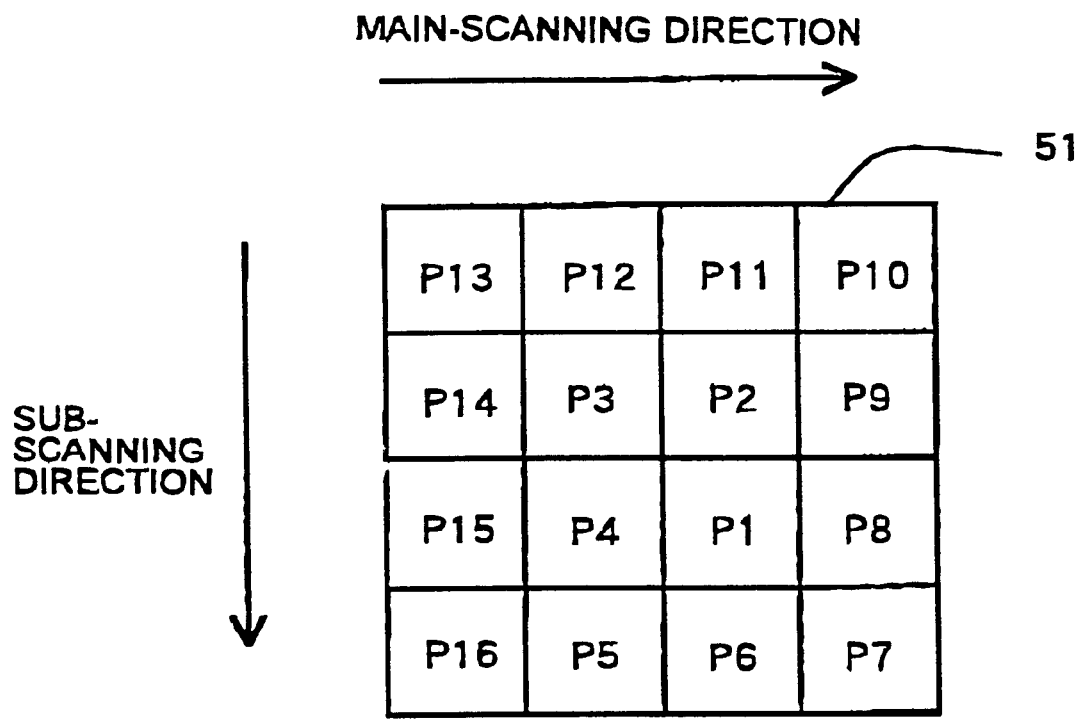
FIG. 9 shows a dot structure of a pixel in a second embodiment.

Next, a tape printing device in a second embodiment will be explained with reference to FIGS. 9 and 10. FIG. 9 shows a dot structure of a pixel in a second embodiment. FIG. 10 is a gradation pattern table of showing the relationship between the gradation level and the dot pattern of a pixel in the second embodiment.

The structure of the tape printing device and the controller in the second embodiment are substantially the same as in the first embodiment. Each of the pixels is printed in a similar manner to the first embodiment in which the print data is sequentially read out form the print buffer 8. A pixel 51 in the second embodiment is formed by 4×4 dots in a matrix form as shown n FIG. 9. A lateral and vertical sides of the matrix are arranged parallel to the main-scanning direction and the sub-scanning direction respectively. The printing priorities of 16 dots in the matrix are assigned to P1 disposed on the third line and third column, P2, P3, . . . P16 in order, which are adjacent in a counterclockwise direction.

The energy level of each of the dots P1 to P16 is determined in 8 levels as well as in the first embodiment. The pixel 51 can be represented in 128 gradation levels provided by 16 dots×8 energy levels. The energy level corresponds to the number of pulses of the data table 41 shown in FIG. 6, so that the pulse train of the number of pulses corresponding to the energy level is applied to the selected heating-element.

Explanation is made on the gradation pattern table 52 of the pixel 51 shown in FIG. 10.

To the dot pattern of the gradation level 1, the energy level 1 is provided to the dot P1 of the pixel 51. In the gradation level 2, the energy level 1 is provided to the dots P1 and P2. In the gradation level 3, the energy level 1 is provided to the dots P1, P2, and P3. Similarly, the energy level 1 is provided in sequence to the dots P4, P5, . . . P16 to form dot patterns of the gradation levels 4 to 16.

In the dot pattern of the gradation level 17, the energy level 2 is provided to the dot P1 and the energy level 1 to the dots P2 to P16. In the gradation level 18, the energy level 2 is provided to the dots P1 and P2 and the energy level 1 to the dots P3 to P16. In the gradation level 19, the energy level 2 is provided to the dots P1, P2, and P3 and the energy level 1 to the dots P4 to P16. Similarly, the energy level 2 is provided to the dots P4 to P16 in order to form dot patterns of the gradation levels 20 to 32.

In the dot pattern of the gradation level 33, the energy level 3 is provided to the dot P1 and the energy level 2 to the dots P2 to P16. In the gradation level 34, the energy level 3 is provided to the dots P1 and P2 and the energy level 2 to the dots P3 to P16. In the gradation level 35, the energy level 3 is provided to the dots P1 to P3 and the energy level 2 to the dots P4 to P16. Similarly, the energy level 3 is provided to the dots P4 to P16 in order to form dot patterns of the gradation levels 36 to 48.

The same applies to the gradation levels 49 to 112. Concretely, the energy levels 4 to 7 are provided to the dots P1 to P16 in order to form dot patterns of the gradation levels 49 to 112. In the dot pattern of the gradation 113, the energy level 8 is provided to the dot P1 and the energy level 7 is provided to the dots P2 to P16. In the gradation level 114, the energy level 8 is provided to the dots P1 and P2 and the energy level 7 to the dots P3 to P16. In the gradation level 115, the energy level 8 is provided to the dots P1 to P3 and the energy level 7 to the dots P4 to P16. Similarly, the energy level 8 is provided to the dots P4 to P16 in order to form dot patterns of the gradation levels 116 to 128.

As mentioned above, in the controller 1 of the tape printing device in the second embodiment, the pixel 51 is constituted by 4×4 dots arranged in a matrix form, wherein the order of printing priority is assigned to the dots P1, P2, . . . P16 in this order. The energy level provided to the dots P1 to P16 is divided into to 8 levels as well as in the first embodiment. The pulse train of the number of pulses corresponding to the energy level for the desired gradation level is applied to the selected heating-element. Accordingly, the pixel 51 can be expressed in 128 gradation levels (16 dots×8 energy levels).

Consequently, the tape printing device in the second embodiment can provide 128 gradation levels which are greatly large in the number than a conventional spirally-shaped dither matrix formed by 4×4 dots. The tape printing device can provide a smoother gradation with a constant resolution caused by the spiral dither matrix.

The present invention may be embodied in other specific forms without departing from the spirit or essential characteristics thereof.

(a) For instance, although the number of pulses according to the gradation level is set in accordance with the data table 40 in the above embodiments, each of the number of pulses in the table 40 may be changed in correspondence with the kinds of ink and others.

(b) Although 8 energy levels are used in the above embodiments, more than 8 levels may be set.

(c) Although the maximum number of pulses in the energy level 8 is set at 63 pulses in the above embodiments, it may be set at more than 63 if the application duration $T_1$ is lengthened and the ON-duration $T_2$ and the OFF-duration $T_{off}$ are shortened.

(d) In the above embodiments, the pixels 31 and 32 is formed by 2×2=4 dots in a matrix form, while the pixel 51 is formed by 4×4 dots in a matrix form; however, any number of dots may be used to form a matrix.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A thermal recording apparatus including:
    a heat recording device provided with a plurality of heating-elements;
    a dot pattern memory for storing a dot pattern defined by a plurality of dots arranged in a matrix form, forming a pixel to be printed with the heat recording device;
    a gradation level pattern memory for storing a plurality of gradation level patterns formed per pixel by determining a minimum and maximum values of dot formation energy to be supplied to the heating-element, and providing the minimum energy value to one of the print dots forming a pixel and to remaining print dots in a predetermined sequence until the maximum energy value is provided to all of the print dots; and
    a heat-generation drive device for selectively driving the heating-elements of the heat recording device in accordance with the dot pattern of the print dots stored in the dot pattern memory and the gradation level pattern stored in the gradation level pattern memory.

2. A thermal recording apparatus according to claim 1, wherein the dot formation energy is divided into a plurality of levels from the minimum value to the maximum value and gradation level patterns corresponding to a number of print dots are formed in each of the energy levels.

3. A thermal recording apparatus according to claim 2, wherein the dot formation energy varies gradually from the minimum value to the maximum value as an increase in gradation density of the pixel.

4. A thermal recording apparatus according to claim 2, further including:
    a first storage device for storing the number of pulses in correspondence with each of a plurality of formation energy levels;
    a read-out device for reading out the number of drive pulses corresponding to the formation energy level from the first storage device;
    a second storage device for storing the number of pulses read out by the read-out device;
    subtract means for subtracting 1 each from the number of drive pulses stored in the second storage device whenever the pulse application means applies the drive pulses to the heating-elements; and
    judgement means for judging whether or not a value obtained by the subtraction by the subtraction means is 0;
    wherein the pulse application means applies the drive pulses to the heating-element until the judgement means judges that the subtracted value become 0.

5. A thermal recording apparatus according to claim 1, wherein the predetermined sequence is determined by appointing one print dot in the matrix form as a reference dot and counting the print dots in a predetermined direction from a print dot adjacent to the reference dot.

6. A thermal recording apparatus according to claim 5, wherein the remaining print dots are selected so as to form a spiral around the reference dot for each of the energy values from the minimum value to the maximum value.

7. A thermal recording apparatus according to claim 1, wherein the heat-generation drive device drives odd heating-elements and even heating-elements of the heat recording device at different timings.

8. A thermal recording apparatus according to claim 7, wherein the pixels printed by the odd heating-elements and those by the even heating-elements are printed so that they are arranged in a staggered and latticed arrangement.

9. A thermal recording apparatus according to claim 1, wherein a density-to-gradation level curve representing a change of density of a pixel formed by the print dots in correspondence with the dot pattern is determined so as to be substantially equal to a density-to-dot-area curve.

10. A thermal recording apparatus according to claim 1, further including:

pulse application means for selectively applying a drive pulse train to the heating-elements;

pulse number setting means for setting a number of pulses of the drive pulse train according to the formation energy of the print dots;

pulse width setting means for setting a width of a first drive pulse of the drive pulse train to be larger than those of a second and subsequent drive pulses; and pulse control means for applying the first drive pulse to the heating-elements thereby to preheat the same up to a predetermined heating temperature and then the second and subsequent drive pulses to the preheated heating-elements to record the pixel.

11. A thermal recording apparatus according to claim 10, wherein the pulse number setting means sets the number of the second and subsequent drive pulses of the drive pulse train so as to become larger as the formation energy of the print dots becomes higher, and sets an increasing rate of the number of pulses so as to be low in a low formation energy area and high in a high formation energy area.

12. A thermal recording apparatus according to claim 11, wherein a density-to-gradation-level curve showing a change in density of a pixel with respect to an increase of the formation energy and a density-to-dots-area curve are determined.

13. A thermal recording apparatus according to claim 1, wherein the print dots defining the dot pattern are arranged in a rhombic manner such that sides of the matrix are not aligned parallel to an arranging direction of the heating-elements or a printing direction perpendicular to the arranging direction, but arranged at an angle of substantially 45 degrees to the arranging direction or the printing direction.

14. A thermal recording apparatus according to claim 1, wherein the heat-generation drive device is adapted for selectively driving the heating-elements of the heat recording device for printing a dot matrix of one pixel interlaced with a dot matrix of another pixel adjacent thereto such that in one printed line along an arranging direction of the heating-elements the print dots of the one pixel are odd-numbered and the print dots of the another pixel are even-numbered.

15. A thermal recording apparatus including:

an input device for inputting character data;

a thermal head provided with a plurality of heating-elements to print characters corresponding to the character data input by the input device on a tape;

a dot pattern memory for storing a dot pattern defined by a plurality of print dots in a matrix form, forming a pixel to be printed with the thermal head;

a gradation level pattern memory for storing a plurality of gradation level patterns formed per pixel by determining a minimum and maximum values of dot formation energy to be supplied to the heating-element, and providing the minimum energy value to one of the print dots forming a pixel and to remaining print dots in a predetermined sequence until the maximum energy value is provided to all of the print dots; and a heat-generation drive device for selectively driving the heating-elements of the thermal head in accordance with the dot pattern of the print dots stored in the dot pattern memory and the gradation level pattern stored in the gradation level pattern memory.

16. A thermal recording apparatus including:

a heat recording device provided with a plurality of heating-elements;

a dot pattern memory for storing data on a dot pattern defined by a plurality of print dots in a matrix form, forming a pixel to be printed with the heat recording device;

a drive energy memory for storing predetermined values each of which corresponds to drive energy applied to the heating-elements and is different in for every group obtained by dividing gradation density data into plural groups, each area having gradation patterns according to a number of the print dots in the matrix form and each gradation pattern being determined by setting the predetermined value to the print dots in a predetermined sequence in each group; and a heat-generation drive device for selectively driving the heating-elements of the heat recording device in accordance with the dot pattern data of the print dots stored in the dot pattern memory and the predetermined values of the dots stored in the drive energy memory.

17. A thermal recording apparatus according to claim 16, wherein the predetermined value in each group is determined so as to become larger as an increase in the gradation density of the pixel.

* * * * *